Patented July 11, 1939

2,165,962

UNITED STATES PATENT OFFICE 2,165,962

PRODUCTION OF ALKYLIDENE DIETHERS OR ETHER-ESTERS

Martin Mueller-Cunradi and Kurt Pieroh, Ludwigshafen-on-the-Rhine, Germany, assignors to I. G. Farbenindustrie Aktiengesellschaft, Frankfort-on-the-Main, Germany No Drawing. Application October 22, 1937, Serial No. 170,424. In Germany October 29, 1936

4 Claims. (Cl. 260—615)

The present invention relates to the production of alkylidene-diethers or ether-esters.

We have found that alkylidene ethers, i. e., diethers or ether-esters, or their saponification products can be obtained in a simple manner and in excellent yields by causing vinyl ethers to react in the presence of catalysts with alkylidene diethers or ether-esters and, if desired, saponifying the resulting compounds. The alkylidene diethers and ether-esters obtained are of higher molecular weight than the starting materials used.

The reaction between vinyl ethers and alkylidene diethers proceeds for example according to the following equation:—

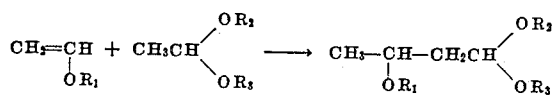

or, when starting from an alkylidene ether-ester:

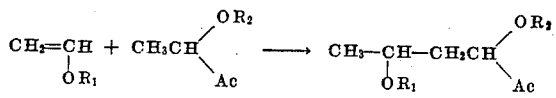

$R_1$, $R_2$ and $R_3$ being alkyl, aralkyl or aryl radicles and Ac being any inorganic or organic acid radicle.

It is also possible to react a plurality of molecules of a vinyl ether with one molecule of an alkylidene diether or ether-ester, whereby when starting from an alkylidene diether, compounds of the following structure:

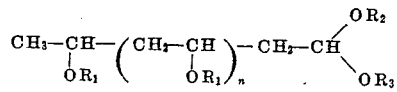

in which $n$ is a whole number are formed. Thus it is possible to react for example 10, 20 or more molecular proportions of vinyl ether with 1 molecular proportion of an alkylidene ether.

Suitable initial materials are for example the ethylidene diethers and ether-esters obtained according to the German Patent No. 566,033 and the acetals prepared in the usual manner by the reaction of aldehydes and alcohols. In many cases it is preferable to carry out the adding on of the vinyl ethers to the alkylidene diethers or ether-esters in one working operation with the preparation of the said compounds, as for example by treating alcohol with such an amount of vinyl ether that the ethylidene diether first formed unites with the excess of vinyl ether, whereby the higher molecular weight alkylidene diether are formed.

As catalysts there may be mentioned in particular substances which are also capable of serving for the polymerization of vinyl ethers, as for example the acid condensing agents specified in the U. S. Patents Nos. 2,104,000, 2,104,001, 2,104,002, in the name of Reppe and Schlichting, and also the addition compounds of boron halides with alcohols and ethers, such as are described for example in the French Patent No. 734,129.

Generally speaking, it is preferable to carry out the reaction at ordinary or moderately elevated temperature. The most suitable temperature can easily be determined by a preliminary test; it depends on the nature and the boiling point of the starting materials. When using as starting materials of lower molecular weight, the reaction is preferably carried out at temperatures between 0° and 100° C. If higher molecular starting materials be used, as for example vinyl ethers of higher molecular aliphatic alcohols, higher reaction temperatures may be more suitable. When using vinyl ethers of low boiling point, it is frequently of advantage to work under pressure. As a rule, the vinyl ethers are completely reacted. The composition of the final product depends mainly on the molecular proportions in which the initial materials are allowed to act on each other. For example, if the alkylidene diethers or ether-esters be used in excess, there are generally obtained addition compounds which contain only two carbon atoms more in the alklidene chain than the initial materials. Thus for example beta-ethoxybutyraldehyde diethyl acetal is obtained in a yield of more than 90 per cent by causing 1 molecular proportion of vinyl ethyl ether and 3 molecular proportions of acetaldehyde diethyl acetal to act on each other. If the alkylidene compounds be united with about the equimolecular amount of or an excess of the vinyl ether, mixtures of alkylidene compounds of higher molecular weight are formed. The resulting addition compounds may usually be readily separated from the unconverted alkylidene compounds by fractional distillation, if desired in vacuo, or by steam distillation.

The alkylidene diethers or ether-esters prepared according to this invention are usually water-clear liquids of high boiling point which are more or less viscous depending on the molecular size. Since they are acetals or ether esters, they may be saponified. If weak acids be used for this purpose, ether aldehydes and the corresponding alcohols or acids are obtained. If the saponification be carried out in the presence of small amounts of mineral acid, there are formed, with simultaneous saponification of all the ether groups and with the splitting off of water, unsaturated aldehydes; for example by heating beta-ethoxybutyraldehyde diethyl acetal with dilute hydrochloric acid, crotonaldehyde and ethyl alcohol are obtained. The saponification may also be carried out in the vapor phase by leading the acetal concerned over catalysts, as for example silica gel, in the presence of water vapor. If saponification be effected with simultaneous catalytic hydrogenation, preferably under pressure, the ether aldehydes are converted into the ether alcohols. For example by the hydrogenating saponification of beta-ethoxybutyraldehyde diethyl acetal there is obtained ethoxy-3-butanol-1 and ethyl alcohol is almost the calculated yield.

The ether alcohols obtained by hydrogenating saponification may be converted by the action of strong saponifying agents, splitting off water, into unsaturated hydrocarbons. For example if ethoxy-3-butanol-1 be treated in a liquid medium with naphthalene sulphonic acid, butadiene and alcohol are obtained.

In the saponification of the alkylidene diethers and ether-esters obtained according to the said process, a working up of the reaction mixture may be wholly or in part dispensed with, or the various stages of saponification may be carried out in one working operation. Thus for example by the hydrogenating saponification of the reaction mixture from vinyl ethyl ether with an excess of acetaldehyde diethyl acetal, there is obtained a mixture of ethyl alcohol and ethoxy-3-butanol-1, because both the beta-ethoxybutyraldehyde diethyl acetal formed and also the unconverted acetaldehyde diethyl acetal are saponified with the formation of ethyl alcohol and the aldehydes are hydrogenated to the corresponding alcohols.

The following examples will further illustrate how the said invention may be carried out in practice but the invention is not restricted to these examples. The parts are by weight.

*Example 1*

216 parts of vinyl ethyl ether are allowed to flow into a mixture of 1062 parts of acetaldehyde diethyl acetal and about 0.5 part of the addition compound of boron fluoride and diethyl ether while stirring, care being taken by cooling that the reaction temperature does not rise above 45° C. When the reaction is completed, a little potassium carbonate is added, the product is decanted off from deposited impurities and distilled. In addition to unchanged acetaldehyde diethyl acetal there is obtained beta-ethoxybutyraldehyde diethyl acetal (boiling point = 190° to 191° C.) in a yield of more than 90 per cent with reference to the amount of acetal reacted.

400 parts of the resulting beta-ethoxybutyraldehyde diethyl acetal have added to them 95 parts of water, 62 parts of ethyl alcohol, 3 parts of glacial acetic acid and 60 parts of a copper catalyst precipitated on silica gel. The mixture is heated in a pressure-tight vessel to 145° C. and hydrogen is led in under a pressure of 200 atmospheres. After about 4 hours, the absorption of hydrogen is completed. The catalyst is filtered off and the reaction mixture distilled in vacuo. After distilling off the ethyl alcohol, water and glacial acetic acid, ethoxy-3-butanol-1 (boiling point at 17 millimeters (mercury gauge) = 68° to 71° C.) is obtained in almost the theoretical yield.

50 parts of the ethoxy-3-butanol-1 thus obtained are heated to boiling with 17 parts of beta-naphthalene sulphonic acid and 1.5 parts of aniline in a vessel having a fractionating column attached thereto. When the temperature in the vessel has reached from about 150° to 170° C., the saponification and splitting off of water commences. There distils off a mixture of water, ethanol and butadiene from which the ethyl alcohol and water are precipitated in a receiver cooled with water. The butadiene formed is condensed in a second receiver which is connected with the first and strongly cooled, and then purified in the usual way.

*Example 2*

100 parts of vinyl isobutyl ether are allowed to flow, while stirring, into a mixture of 696 parts of acetaldehyde di-isobutyl acetal and about 0.5 part of the addition compound of boron fluoride and diethyl ether, the temperature being kept at about 55° C. by cooling. When the reaction is completed, the mixture is neutralized with potassium carbonate and distilled. There is thus obtained a yield of about 90 per cent (with reference to the amount of acetal reacted) of beta-isobutoxybutyraldehyde diisobutyl acetal (boiling point at 15 millimeters (mercury gauge) = 134° to 138° C.).

The beta-isobutoxybutyraldehyde di-isobutyl acetal is subjected in the manner described in Example 1 to a hydrogenating saponification, whereby isobutoxy-3-butanol-1 (boiling point at 22 millimeters (mercury gauge) = 94° C.) is obtained in a very good yield.

What we claim is:

1. A process for the production of alkylidene ethers which comprises causing vinyl ethers to react with compounds of the group consisting of alkylidene diethers and ether-esters in the presence of inorganic, practically anhydrous acid reacting catalysts capable of promoting the polymerization of vinyl ethers.

2. A process for the production of alkylidene ethers which comprises causing an excess of a vinyl ether to react with a compound of the group consisting of alkylidene diethers and ether-esters in the presence of inorganic, practically anhydrous acid reacting catalysts promoting the polymerization of vinyl ethers.

3. As new products the compounds of the general formula

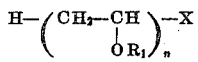

wherein $R_1$ represents an alkyl radicle, wherein X stands for an alkylidene radicle of the group consisting of alkylidene diethers and ether-esters, which radicle is attached to the methine group shown with an alkylidene carbon atom, and wherein $n$ stands for a whole number.

4. As new products the compounds of the general formula

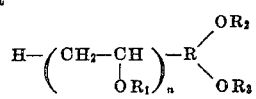

wherein $R_1$, $R_2$ and $R_3$ represent alkyl radicles, wherein R stands for the radicle of an aliphatic hydrocarbon, and wherein $n$ stands for a whole number.

MARTIN MUELLER-CUNRADI.
KURT PIEROH.